(12) United States Patent
Reo

(10) Patent No.: US 6,972,112 B1
(45) Date of Patent: Dec. 6, 2005

(54) COMPARTMENT COVER, KIT AND METHOD FOR FORMING THE SAME

(75) Inventor: Ned J. Reo, Saratoga Springs, NY (US)

(73) Assignee: Specialty Silicone Products, Inc., Ballston Spa, NY (US)

( * ) Notice: Subject to any disclaimer, the term of this patent is extended or adjusted under 35 U.S.C. 154(b) by 477 days.

(21) Appl. No.: 09/562,020

(22) Filed: May 2, 2000

Related U.S. Application Data

(63) Continuation-in-part of application No. 09/263,308, filed on Mar. 5, 1999.

(51) Int. Cl.[7] .............................. B01L 3/02; B01L 3/00; C12M 1/22; C12M 3/00; B29C 59/00
(52) U.S. Cl. .................... 422/99; 422/102; 435/305.3; 220/267; 220/260; 220/255; 264/241; 264/129; 264/134
(58) Field of Search ............... 422/102, 99; 435/305.3; 220/267, 260, 255; 204/241, 129, 134, 320

(56) References Cited

U.S. PATENT DOCUMENTS

| | | | |
|---|---|---|---|
| 2,698,272 A | | 12/1954 | Clapp et al. |
| 2,884,150 A | | 4/1959 | Weishselbaum et al. |
| 3,302,854 A | | 2/1967 | Midgley et al. |
| 3,744,661 A | | 7/1973 | Fischer, Jr. |
| 4,599,314 A | * | 7/1986 | Shami ........................ 435/287 |
| 4,604,181 A | * | 8/1986 | Mirtich et al. ............... 204/298 |
| 4,608,231 A | * | 8/1986 | Witty et al. .................... 422/61 |
| 4,829,006 A | * | 5/1989 | Smith et al. ................. 435/301 |
| 5,005,721 A | * | 4/1991 | Jordan ........................ 220/23.4 |
| 5,112,574 A | | 5/1992 | Horton |
| 5,199,595 A | * | 4/1993 | Muggli et al. ............... 220/450 |
| 5,282,543 A | | 2/1994 | Picozza et al. |
| 5,324,482 A | | 6/1994 | Scaramella et al. |
| 5,501,706 A | * | 3/1996 | Arenberg ...................... 623/16 |
| 5,610,213 A | * | 3/1997 | Sumpter et al. ............. 524/267 |
| 5,716,699 A | | 2/1998 | Reo |
| 5,767,185 A | | 6/1998 | Reo |
| 5,801,055 A | * | 9/1998 | Henderson ............... 435/297.5 |
| 6,004,496 A | | 12/1999 | Reo |
| 6,030,582 A | * | 2/2000 | Levy ............................ 422/99 |
| 6,066,299 A | * | 5/2000 | Lodge ......................... 422/102 |
| 6,074,614 A | * | 6/2000 | Hafeman et al. ........... 422/102 |
| 6,096,562 A | * | 8/2000 | Bunn et al. ................. 436/518 |
| 6,136,273 A | * | 10/2000 | Seguin et al. ................. 422/99 |
| 6,251,662 B1 | * | 6/2001 | Day |

* cited by examiner

*Primary Examiner*—Jill Warden
*Assistant Examiner*—Brian R Gordon
(74) *Attorney, Agent, or Firm*—Schmeiser, Olsen & Watts

(57) ABSTRACT

A vial pack cover, a vial pack kit, and a method for forming the vial pack cover is provided. The vial pack cover can simultaneously cover a plurality of containers while preventing the contents of the containers from degrading or permeating through the cover. In addition, the vial pack cover allows a user to access individual containers without having to remove the cover from the un-accessed containers.

19 Claims, 10 Drawing Sheets

COMPARTMENT COVER, KIT AND METHOD FOR FORMING THE SAME

The present patent application is a continuation-in-part of copending U.S. patent application Ser. No. 09/263,308, filed Mar. 5, 1999 and entitled "VIAL PACK COVER, VIAL PACK KIT, AND METHOD FOR FORMING THE VIAL PACK COVER."

BACKGROUND OF THE INVENTION

1. Technical Field

The present invention generally relates to a vial pack cover, a vial pack kit, and a method for forming the same. More particularly, the present invention relates to a vial pack cover and method for forming the same for engaging a vial pack having a plurality of containers therein.

2. Background Art

In the medical, analytical chemistry, and biotechnology field, vial packs are often used for simultaneously testing multiple reactions. Such vial packs often include a plurality of compartments into which vials or other similar vessels are placed. Materials or samples are inserted into the removable vials, or in some instances, directly into the compartments of the vial pack. Accordingly, a cover or microplate is required for the vial pack so that the samples contained therein will not be spilled or otherwise released to the surrounding environment, contiguous containers, or become contaminated with outside agents. Heretofore, many have attempted to solve this problem by employing inferior variations. Examples include the following, all of which are herein incorporated by reference:

- U.S. Pat. No. 2,698,272 to Clapp et al.;
- U.S. Pat. No. 2,884,150 to Weichselbaum et al.;
- U.S. Pat. No. 3,302,854 to Midgley et al.;
- U.S. Pat. No. 3,744,661 to Fischer, Jr.;
- U.S. Pat. No. 5,112,574 to Horton;
- U.S. Pat. No. 5,282,543 to Picozza et al.; and
- U.S. Pat. No. 5,324,482 to Scaramella et al.

All of these related art devices are inadequate because they fail to provide, inter alia, a barrier layer on a cover. The failure to provide a barrier layer can result in the degredation of the cover from solvents or other material placed within the containers. Moreover, a barrier layer prevents gasses accumulated within the containers from permeating through the cover and into the surrounding environment.

These related art devices also are inadequate because they fail to provide, inter alia, a cover without a barrier layer that is made from a solvent-resistant silicone rubber to prevent gasses accumulated within the containers from permeating through the cover and into the surrounding environment.

In addition, none of the related art references disclose a cover that allows a user to simultaneously cover a plurality of containers while still allowing the user to access an individual container without having to remove the cover from the entire vial pack. Accordingly, with these related devices, a user must remove the cover from all of the containers to access one individual container. Such a requirement may lead to spillage of the samples contained therein or contamination by outside agents. Therefore, there exists the need for a vial pack cover and method for forming the same that will allow a user to simultaneously cover a plurality containers without concern for the cover being degraded or permeated therethrough by the contents of the containers. In addition, there exists a need for the cover to be such that a user may access individual containers without having to remove the cover from the un-accessed containers.

SUMMARY OF THE INVENTION

The present invention overcomes the deficiencies of the related art by including a vial pack cover and method for forming the same that will allow a user to simultaneously cover a plurality of containers while preventing the contents held therein from degrading the cover, permeating through the cover, or contaminating other containers. In addition, the vial pack cover of the present invention is such that a user may access individual containers while allowing the cover to remain on the un-accessed containers.

According to one aspect of the present invention, a method for forming a vial pack cover is provided, which includes: (1) providing a mold having a plurality of cavities therein; (2) providing an amount of solvent-resistant material to the mold; (3) forming a vial pack cover, including a plurality of plug portions; and 4) removing the vial pack cover from the mold.

According to a second aspect of the present invention, a method of using a solvent-resistant material as a cover for a vial pack is provided. The method includes: (1) providing a solvent-resistant material as a cover including a plurality of plug portions; and (2) engaging the cover with a vial pack having a plurality of containers therein, wherein each plug portion releasably engages one of the containers.

According to a third aspect of the present invention, a vial pack cover is provided. The vial pack cover includes: (1) a plurality of plug portions joined together, wherein the plug portions are formed from a solvent-resistant material.

According to a fourth aspect of the present invention, a vial pack cover is provided and includes: (1) a support sheet; and (2) a plurality of plug portions fixed to the support sheet, wherein both the support sheet and the plug portions are formed from a solvent-resistant material.

According to a fifth aspect of the present invention, a vial pack kit is provided. The vial pack kit includes: (1) a pack, wherein the pack includes a plurality of containers; and (2) a cover for covering the pack, wherein the cover includes: (a) a support sheet; and (b) a plurality of plug portions integrally formed as a part of the support sheet, wherein both the support sheet and the plug portions are formed from a solvent-resistant material wherein each plug portion releasably engages one of the containers of the pack.

According to a sixth aspect of the present invention, a vial pack kit is provided. The vial pack kit includes: (1) a device for covering a vial pack including a plurality of plug portions formed from a solvent-resistant material wherein the plug portions are joined together; and (2) an apparatus for removing one of the plug portions from the device.

It is therefore an advantage of the present invention to provide a vial pack cover for simultaneously covering a plurality of containers while preventing the contents of the containers from degrading or permeating through the cover. In addition, it is also an advantage of the present invention to provide a cover that will allow a user to access individual containers without having to remove the cover from the un-accessed containers.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, nor is it intended to be limiting as to the scope of the invention in any way.

BRIEF DESCRIPTION OF THE DRAWINGS

These and other features and advantages of this invention will be more readily understood from the following detailed description of the various aspects of the preferred embodiments of the invention taken in conjunction with the accompanying drawings in which.

Figure 1:
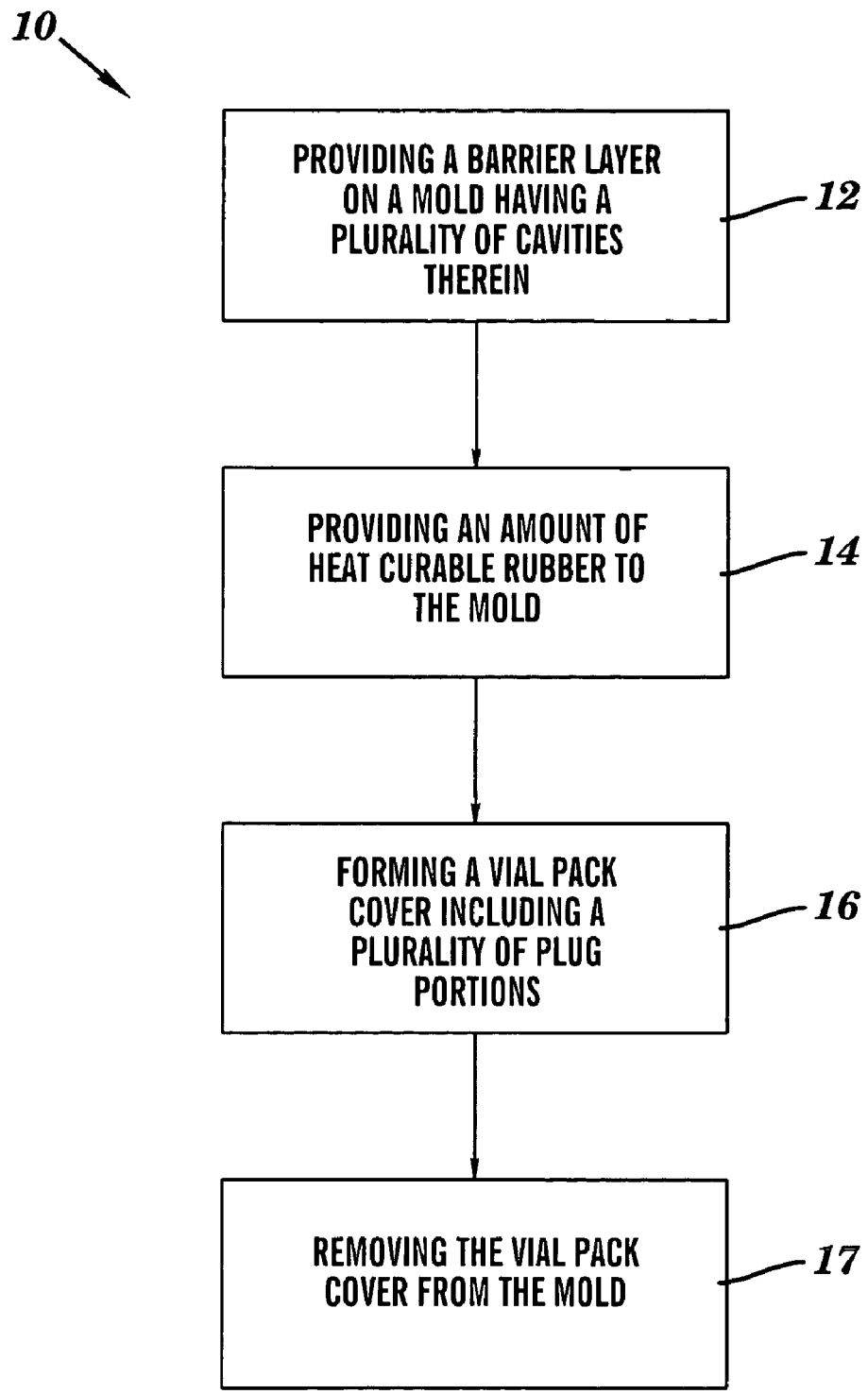
FIG. 1 is a flow chart of a method for forming a coated vial pack cover in accordance with an embodiment of the present invention.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements between the drawings.

DETAILED DESCRIPTION OF THE PREFERRED EMBODIMENTS

Figure 2:
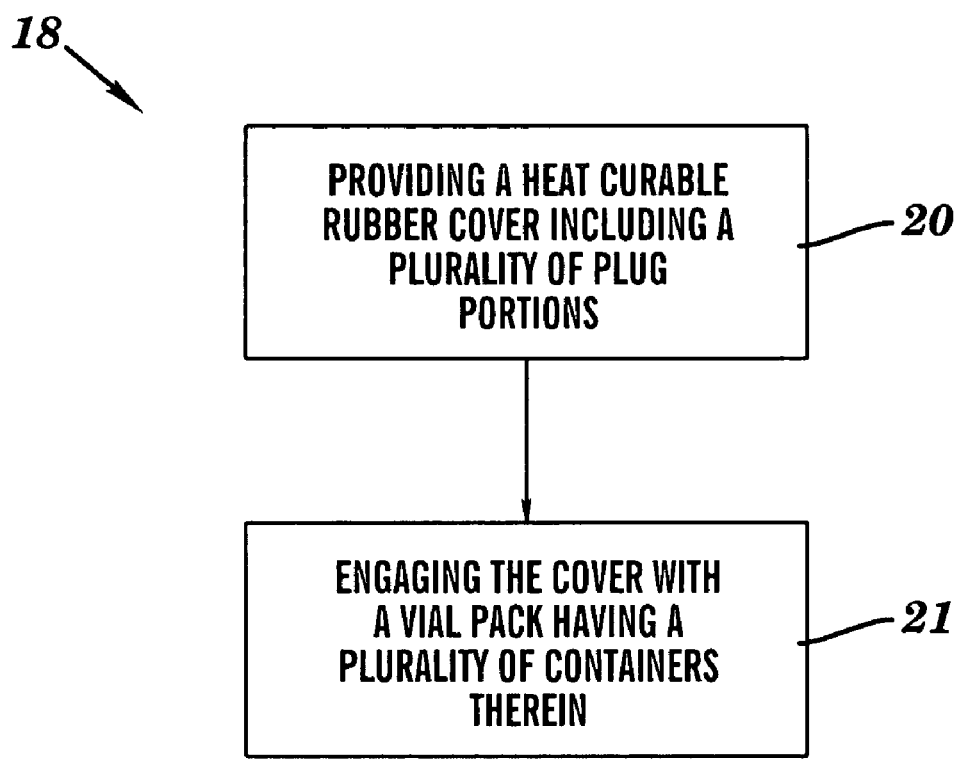
FIG. 2 is a flow chart of a method of using a coated heat curable rubber as a cover for a vial pack in accordance with an embodiment of the present invention.
Figure 3:
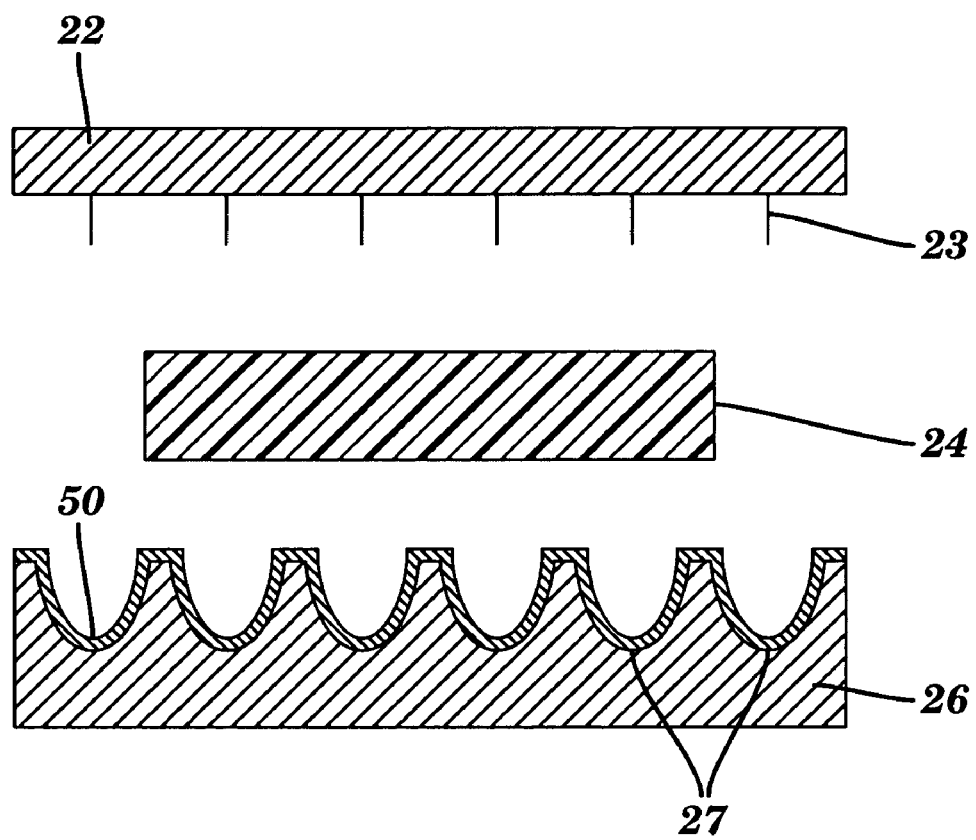
FIG. 3 is a front sectional view of a heat curable rubber and a mold in accordance with an embodiment of the present invention.

Referring now to the drawings, FIGS. 1–10 show the vial pack cover and method for forming the same in accordance with the present invention. FIG. 1, depicts a flowchart of a method 10 for forming a vial pack cover 36. The first step 12 of the method 10 is to provide a barrier layer 50 on a mold having a plurality of cavities 27 therein. The mold is shown in FIG. 3 and includes body portion 26, depressions 27, and cap 22 having finger-like projections 23 thereon. Although a precise number of depressions is not necessary, many vial packs 28 are formed with specific number compartments. Thus, the mold used to form the vial pack cover 36 should include an equal quantity of depressions. In addition, although, the barrier layer 50 is shown as being applied only to the body portion 26 of the mold, it should be understood that the barrier layer 50 may be applied to additional components of the mold depending on the needs of the user and the product that is desired.

Barrier layer 50 is preferably polytetrafluoroethylene (PTFE), however it should be understood that many equivalents exist. For example, any material that will protect an elastomer from solvents, such as toluene, acetone, or the like and that will slow down or prevent the permeation of gasses will suffice, such as aluminum. In addition, barrier layer 50 is preferably applied to the base portion 26 of the mold by spraying. However, it should be understood that other application techniques can be used. For example, barrier layer 50 could be applied as a solid, dry pre-formed sheet that takes the form of the base portion 26, including the depressions 27.

The next step 14 in the method 10 is to provide an amount of solvent-resistant, heat curable rubber 24 to the mold. The solvent-resistant, heat curable rubber is the material that will form the vial pack cover 36 after the method 10 is complete. Preferably the solvent-resistant, heat curable rubber is silicone rubber, however it should be appreciated that many equivalents may be used. For example, the heat curable rubber 24 can be any silicone elastomer, organic elastomer, viton, sanoprene, or EPDM. In addition, the solvent-resistant, heat curable rubber 24 is preferably provided to the mold in a 2"×4" segment weighing approximately 24 grams. However, it should be understood that the quantity of the heat curable rubber 24 that is provided to the mold will vary with the size and dimensions of the mold.

It should also be appreciated that the barrier layer 50 can be applied or sprayed directly onto the heat curable rubber 24 prior to its insertion into the mold. This can be in addition to in or lieu of the application of the barrier layer 50 to the mold.

The next step 16 of the method 10 is to form a vial pack cover 36 that includes a plurality of plug portions 48. This is generally accomplished by a compression molding. Specifically heat and pressure are applied to the mold to cure the solvent-resistant, heat curable rubber into a vial pack cover 36 having a plurality of plug portions 48, each of which are coated with the barrier layer 50. The heat and pressure applied to the mold are preferably about 340 F and about 500 PSI, respectively. However, it should be understood that the operating conditions may vary. In addition, although compression molding is preferred, it should be appreciated that other processes may be used. For example, a liquid injection molding (LIM) process or a room temperature vulcanizing (RTV) process could be implemented.

Figure 5:
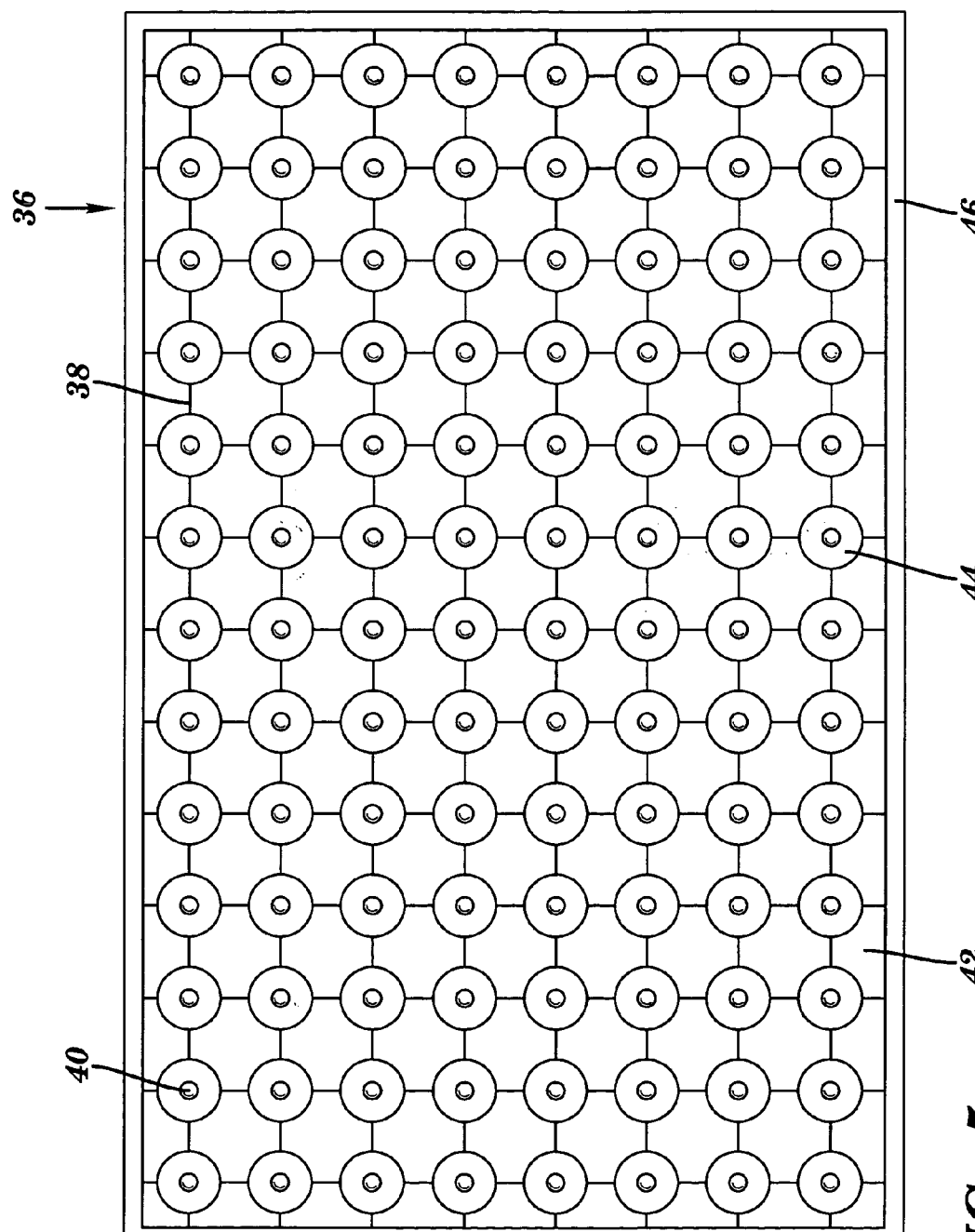
FIG. 5 is a top view of a vial pack cover in accordance with an embodiment of the present invention.
Figure 6:
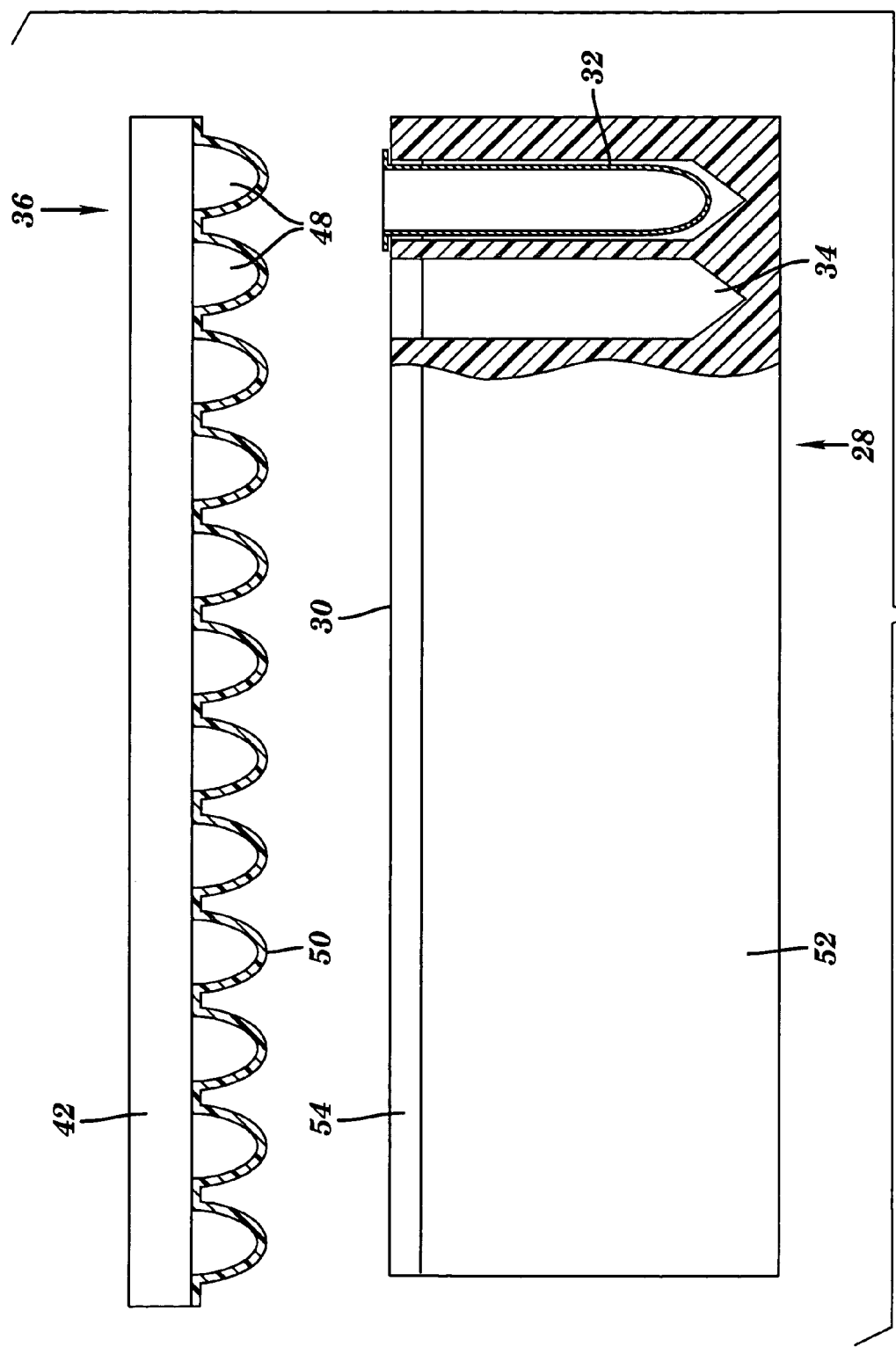
FIG. 6 is a partial side view of the vial pack cover prior to engaging the vial pack in accordance with an embodiment of the present invention.

Finally, the last step 17 of the method 10 is to remove the completed vial pack cover 36 from the mold. FIGS. 5 and 6 show the vial pack cover 36 constructed in accordance this method 10. Referring to these Figs., the vial pack cover 36 generally includes a support sheet 42, a top surface 44 of plug portion 48, needle aperture 40, optional ribbing 38 and 46, and a barrier layer 50 covering the plug portions 48. The ribbing 38 is optional and can be used to join the plug portions 48 together and to increase the overall durability and strength of the vial pack cover 36. In addition, as indicated above, the barrier layer is preferably applied only to the base portion 26 of the mold. Accordingly, only the bottom surface of the support sheet 42 and the plug portions 48 are shown as having been covered with the barrier layer 50. However, if the user had applied the barrier layer to additional components of the mold, it should be understood that additional locations of the vial pack cover 36 would also be covered by the barrier layer 50 in additional locations.

Figure 4:
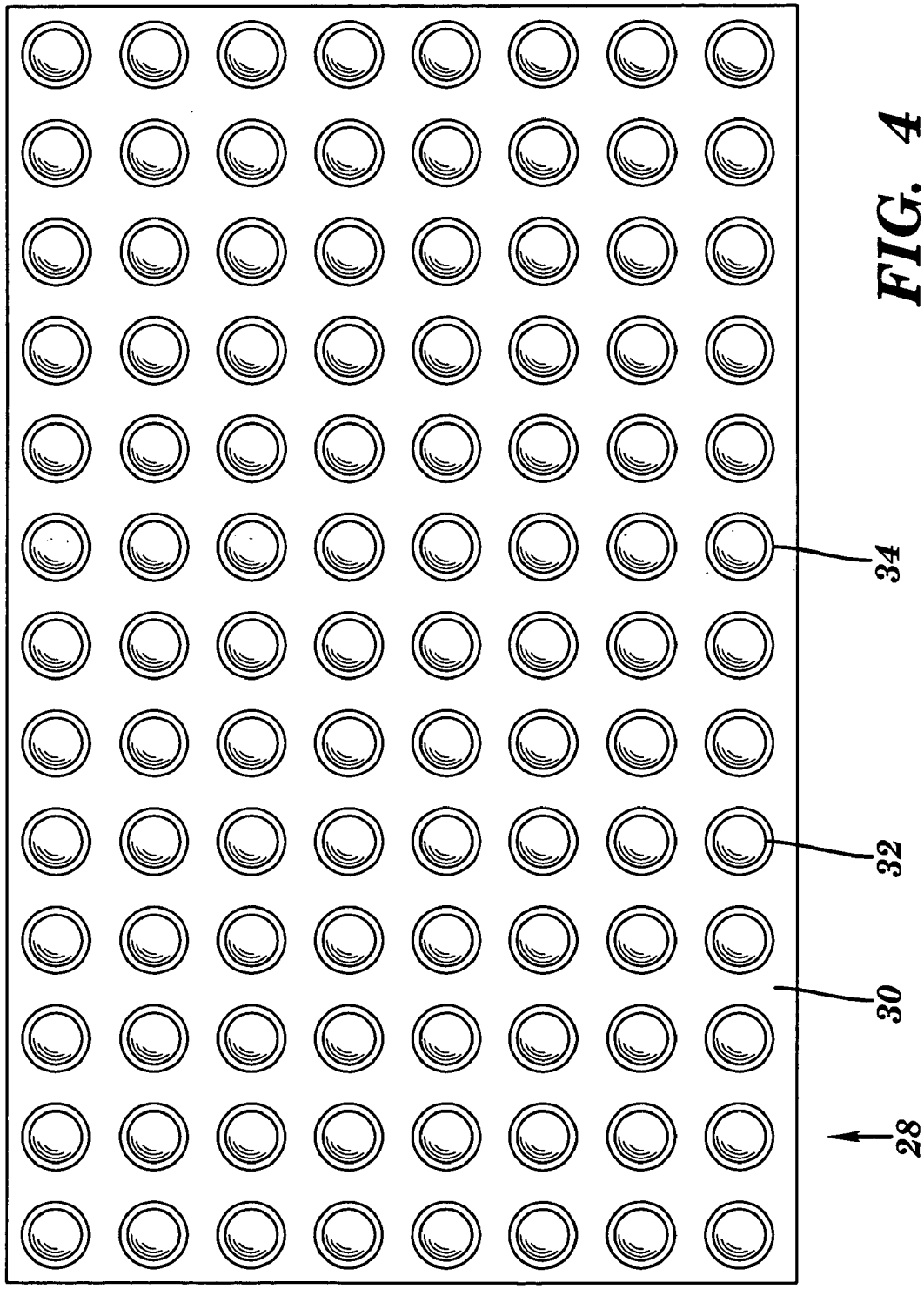
FIG. 4 is a top view of a vial pack in accordance with an embodiment of the present invention.
Figure 8:
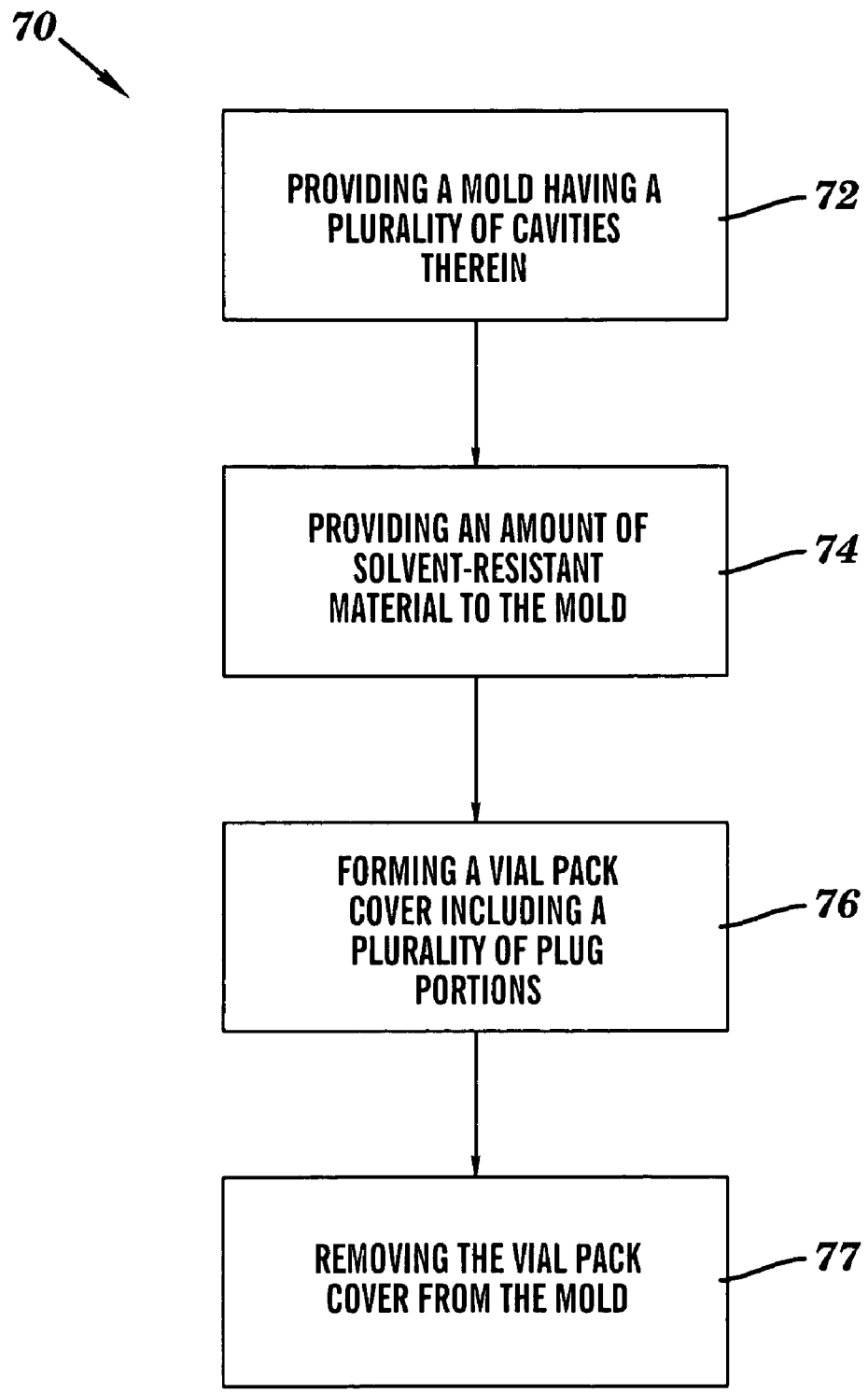
FIG. 8 is a flow chart of a method for forming a vial pack cover using a solvent-resistant material in accordance with an embodiment of the present invention.
Figure 9:
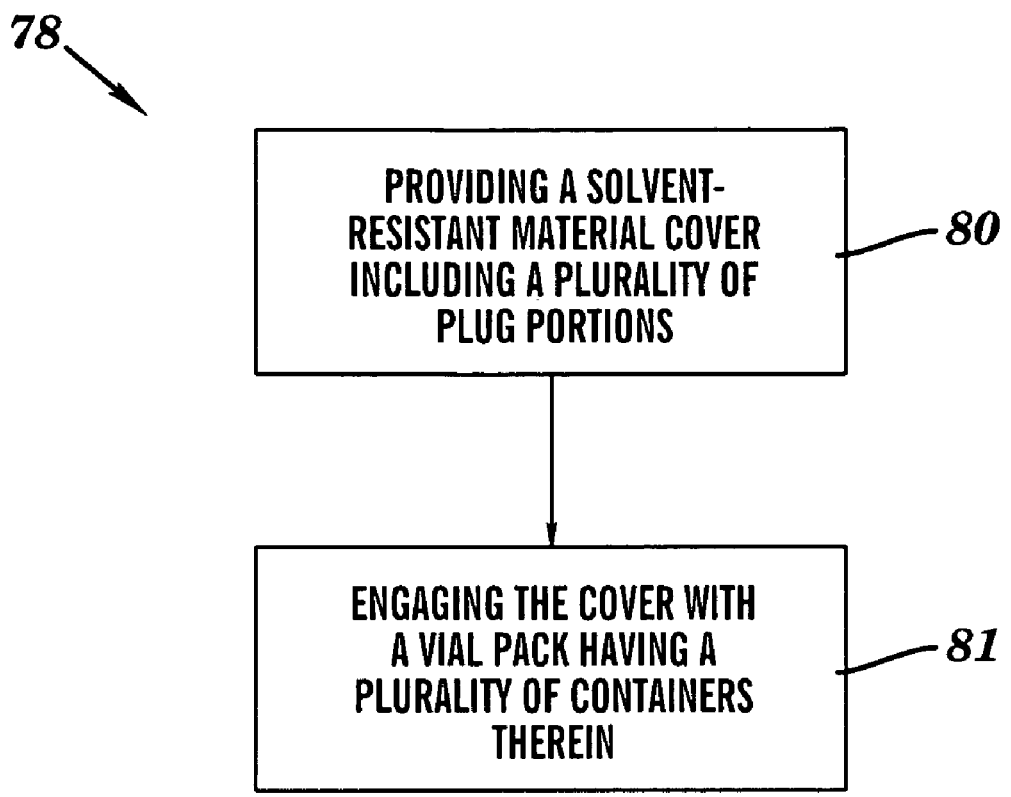
FIG. 9 is a flow chart of a method of using a solvent-resistant material as a cover for a vial pack in accordance with an embodiment of the present invention.
Figure 10:
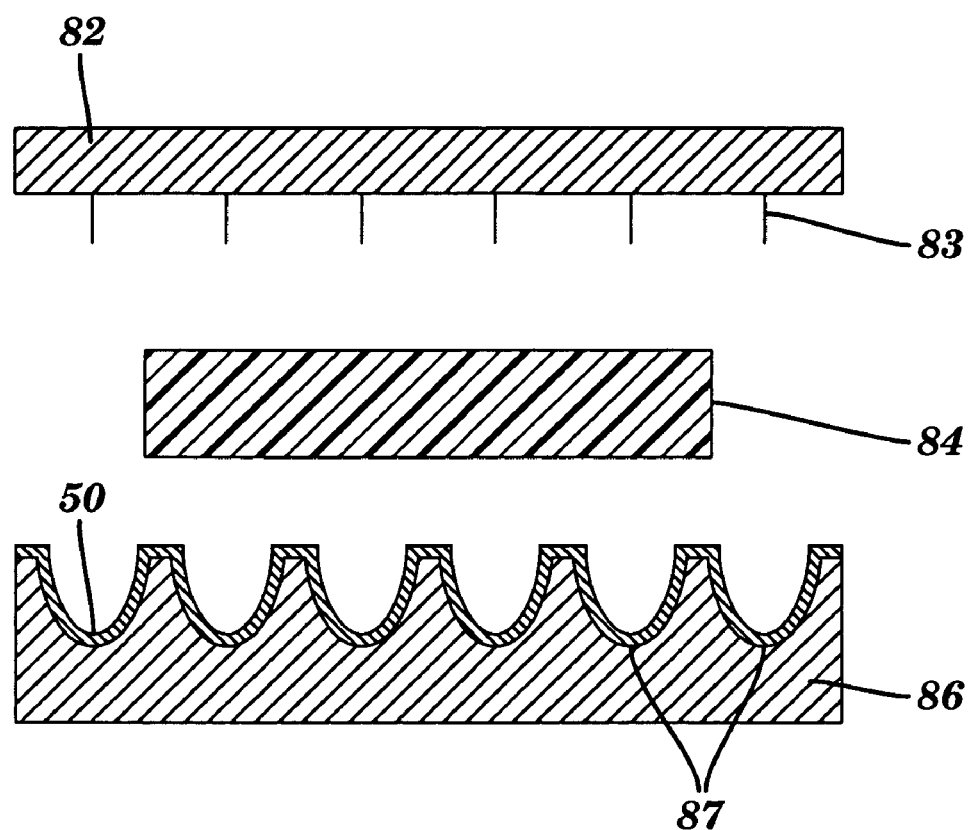
FIG. 10 is a front sectional view of a solvent-resistant material and a mold in accordance with an embodiment of the present invention.

FIGS. 8–10 show the vial pack cover and method for forming the same in accordance with the present invention where the cover is made from a solvent-resistant material. FIG. 8, depicts a flowchart of a method 70 for forming a vial pack cover 36 (FIG. 4). The first step 72 of the method 70 is to provide a mold having a plurality of cavities 87 therein. The mold is shown in FIG. 10 and includes body portion 86, depressions 87, and cap 82 having finger-like projections 83 thereon. Although a precise number of depressions is not necessary, many vial packs 28 are formed with specific number compartments. Thus, the mold used to form the vial pack cover 36 should include an equal quantity of depressions.

The next step 74 in the method 70 is to provide an amount of solvent-resistant material 84 to the mold. The solvent-resistant material is the material that will form the vial pack cover 36 after the method 70 is complete. Preferably the heat curable rubber is silicone rubber that is solvent-resistant, like an elastomer made from siloxanes substituted with 10%–30% 3,3,3 trifluropropyl group, however it should be appreciated that many equivalents may be used. In some embodiments the solvent-resistant material may be a silicone rubber with a fluoropolymer made from siloxanes substituted with 10%–30% 3,3,3 triflouropropyl groups. In some embodiments the solvent-resistant material may be a barrier layer between 3 mils and 25 mils of skived polytetrafluoroethylene etched with sodium naphthalene. In some embodiments the solvent-resistant material may be a barrier layer formed of a continuous roll of cast liquid polytetrafluoroethylene. In some embodiments, the solvent-resistant material may be a barrier layer formed of at least 2 mils of flourinated ethylene propylene treated by plasma. The solvent-resistant, heat curable rubber is resistant to solvents, and in particular organic or hydrocarbon solvents e.g. aromatic or aliphatic solvents like toluene or benzene. In addition, the heat curable rubber 84 is preferably provided to the mold in a 2"×4" segment weighing approximately 24 grams. However, it should be understood that the quantity of the solvent-resistant, heat curable rubber 84 that is provided to the mold will vary with the size and dimensions of the mold.

The next step 76 of the method 70 is to form a vial pack cover 36 that includes a plurality of plug portions 48. This is generally accomplished by a compression molding, as described above.

Finally, the last step 77 of the method 70 is to remove the completed vial pack cover 36 from the mold. FIGS. 5 and 6 show the vial pack cover 36 constructed in accordance this method 70. Referring to these Figs., the vial pack cover 36 generally includes a support sheet 42, a top surface 44 of plug portion 48, needle aperture 40, optional ribbing 38 and 46, and a barrier layer 50 covering the plug portions 48. The ribbing 38 is optional and can be used to join the plug portions 48 together and to increase the overall durability and strength of the vial pack cover 36.

The vial pack cover 36 is used to engage a vial pack 28 or other similar container for either method or 70. As shown in FIGS. 4 and 6 the vial pack 28 includes a body portion 52, an upper surface 30, and compartments 34. As indicated above, a precise 1 quantity of compartments 34 is not necessary, however, it should also be understood that the quantity of compartments 34 should be matched by the quantity of plug portions 48. In addition, the vial pack 28 should be constructed of a material that will not be degraded by the contents placed therein, as known by those of ordinary skill in the art.

Inside of the compartments 34, vials 32 or other similar storage vessels may optionally be placed. A user can insert the materials to be tested inside of the vials 32 or into the compartments 34 directly. It should be understood that the term containers as set forth herein refers to either the compartments or the vials.

Once the materials have been inserted into the compartments, the user will then engage the vial pack cover 36 with the vial pack 28, and in the event vials 32 are used, with the vials 32 as well. Optionally, the vial pack 28 may include a ridge or groove 54. In such an embodiment, the ribbing 46, optionally disposed along the periphery of the support sheet 42 of the vial pack cover 36, will engage the ridge 54 to aid in retaining the vial pack cover 36 to the vial pack 28. It should be understood, however, that many equivalent variations exist for further securing the vial pack cover 36 to the vial pack 28. For example, a clamp(s) (not shown), complementary male and female connectors (not shown), snap connectors (not shown), or various adhesives (not shown) could be used.

Once the vial pack cover 36 is secured over the vial pack 28, the plug portions 48 will protrude into the openings of compartments 34 and, if used, the openings of the vials 32 as well. The plug portions 48 are formed to releasably engage the compartments 34 or, if used, the vials 32. In particular, the frictional force between the plug portions 48 and the compartments 34 or the vials 32 will ensure that the vial pack cover 36 remains secured thereto such that material contained within the compartments 34 or vials 32 will remain therein.

With method 10, the purpose of the barrier layer 50 is to ensure that the vial pack cover 36, and more specifically the plug portions 48, do not become degraded or damaged by the materials placed within the compartments 34 or the vials 32. In addition, barrier layer 50 will slow down or prevent the permeation of gasses from inside of the compartments 34 or vials 32 to the outside environment. In related devices that lack the barrier layer 50, not only are increased instances of cover degradation observed but also increased permeation of gasses through the cover 36. Gas permeation through the vial pack cover 36 leads to contamination of the surrounding environment as well as the degraded accuracy of the medical, chemical, or biotechnological test(s) being performed due to loss of the sample.

With method 70, the purpose of using a solvent-resistant material 84 is to ensure that the vial pack cover 36, and more specifically the plug portions 48, do not become degraded or damaged by the materials placed within the compartments 34 or the vials 32. In addition, solvent-resistant, heat curable rubber 84 will slow down or prevent the permeation of gasses from inside of the compartments 34 or vials 32 to the outside environment. In related devices that lack the solvent-resistant, heat curable rubber 84, not only are increased instances of cover degradation observed but also increased permeation of gasses through the cover 36. Gas permeation through the vial pack cover 36 leads to contamination of the surrounding environment as well as the degraded accuracy of the medical, chemical, or biotechnological test(s) being performed due to loss of the sample.

As indicated above, silicone rubber is preferred as the material from which the vial pack cover 36 is formed because of its various characteristics. Specifically, silicone rubber is able to maintain its consistency and characteristics from temperatures as low as about −165 F to as high as about 600 F. In addition, silicone rubber is clean when punctured inasmuch as a needle or syringe can penetrate the silicone without becoming contaminated with fragments of silicone. Moreover, once punctured by a needle or the like, silicone rubber is compliant and will re-seal.

Once the vial pack cover 36 is secured over the vial pack 38, a user may perform testing or other operation on the contents of the compartments 34 or vials 32 by injected materials through the needle apertures 40 positioned on the top surface 44 of the plug portions 48. The needle apertures 40 do not extend completely through the plug portion 48. In contrast, they extend only partially therethrough to ensure that the material contained within the compartments 34 or the vials 32 does not spill through the needle apertures 40. The needle apertures are preferably formed during the molding of the vial pack cover 36 and are formed by the finger-like projections 23 disposed along the cap 22 of the mold. However, it should be appreciated that many variations exist for forming the needle apertures 40. For example, the needle apertures 40 can be formed after the molding has been completed.

By injecting the desired material through the vial pack cover 36, a user is not forced to remove the cover from the vial pack 28. Thus, spillage of the materials contained within the compartments 34 or the vials 32 is not risked. In addition, because the vial pack cover 36 is formed from a silicone or organic elastomer, it is easily and cleanly penetrable by a needle or syringe and will re-seal upon the withdrawal of the needle. This will ensure that fragments of the vial pack cover 36 do not contact and/or contaminate the materials contained within the compartments 34 or the vials 32. Moreover, by using an elastomer that is re-sealable, the hole made in the plug portion 48 by the needle will close once the needle is withdrawn. Thus, reducing the risk of material spillage.

Figure 7:
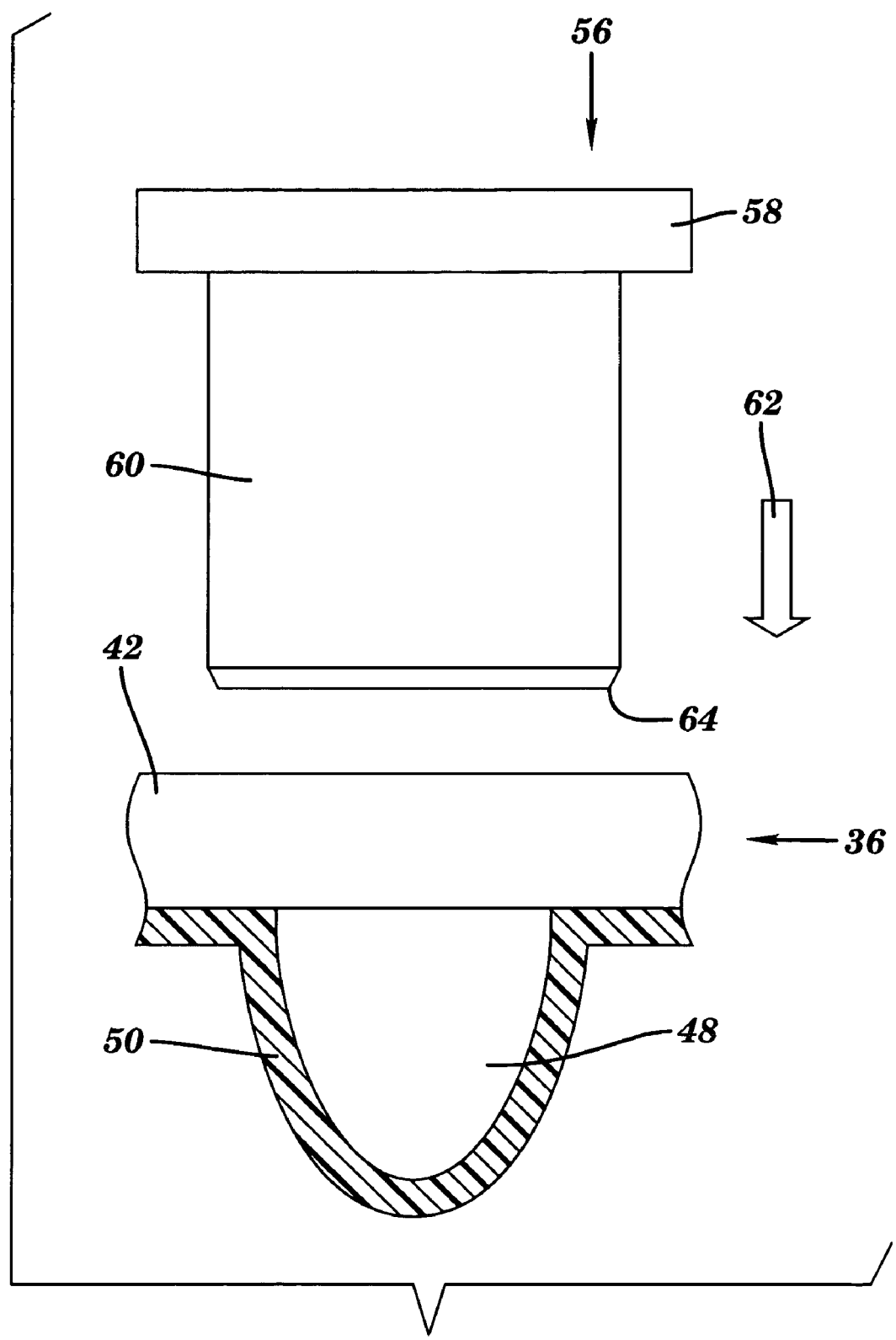
FIG. 7 is a front view of a cutter from one embodiment of the present invention for removing one portion of the vial pack cover.

Referring to FIG. 7, a cutter 56 is shown and generally includes a handle portion 58, a cutting portion 60, and a cutting edge 64. As shown the cutter 56 can be used to remove individual plug portions 48 and/or vials 32 from the vial pack 28. This need arises when a user desires to access one of the compartments 34 or vials 32. Without a cutter, a user must completely remove the entire vial pack cover 36 from the vial pack 28 in order to access individual compartments 34 or vials 32. Such as requisite often leads to spillage or contamination of the materials contained therein. However, with the cutter 56 of the present a user can access individual compartments 34 or vials 32.

To be used, the cutter 56 is centered over the plug portion 48 of the compartment 34 or vial 32 in which access is desired. The cutter 56 is then moved in the direction indicated by directional arrow 62 while being rotated about the plug portion 48. The cutting edge 64 will cut through the support sheet 42 and the ribbing 38, thus, freeing an individual plug portion 48 from the vial pack cover 36. The user is then left with either an individual vial 32 that is plugged and free from the vial pack 28 or an individually uncovered compartment 34. However, the vial pack cover 36 remains firmly secured over the un-accessed compartments 34 or vials 32. Although a specific design for the cutter 56 has been described, it should be appreciated that many equivalent devices could be implemented. Moreover, it is envisioned that other apparatuses may be used for removing the plug portions 48. For example, the upper surface 44 of the plug portions 48 could be constructed with perforations or serrated edges allowing the user to manually remove individual plug portions 48 from the cover 36.

FIG. 2 shows another method 18 in accordance with the present invention. Specifically, the method 18 is a method of using a coated heat curable rubber as a cover for a vial pack. The first step 20 of the method is to provide a heat curable rubber including a plurality of plug portions coated with a barrier layer. This structure represents the vial pack cover 36 formed from the method 10 and is described above. The second step 21 is to engage the cover 36 with a vial pack 28 having a plurality of containers therein. This indicates that each plug portion 48 of the vial pack cover 36 will releasably engage either a compartment 34 or, if used, a vial 32, as described in detail above.

FIG. 9 shows another method 78 in accordance with the present invention. Specifically, the method 78 is a method of using a solvent-resistant material as a cover for a vial pack. The first step 80 of the method is to provide a solvent-resistant material including a plurality of plug portions. This structure represents the vial pack cover 36 formed from the method 70 and is described above. The second step 21 is to engage the cover 36 with a vial pack 28 having a plurality of containers therein. This indicates that each plug portion 48 of the vial pack cover 36 will releasably engage either a compartment 34 or, if used, a vial 32, as described in detail above.

With respect to the first method 10, the following experiment run was recorded:

(1) the mold was preheated to 340 F;
(2) preforms of silicone rubber of approximately 0.200" in thickness were provided;
(3) the preforms were cut to 1%" in width and 3" in length and weighed 24 grams;
(4) the bottom of the mold was sprayed with CAMIE 2000 TEFLON a polytetraflouroethylene;
(5) the part were molded using 20 tons on the lab press and 3000 psi on the lab extension press;
(6) the molding was performed using a 5 minute cycle time;
(7) the molded parts were removed from the mold and another preform(s) was inserted into the mold for the next cycle; and
(8) the cycle was repeated.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method of using a solvent-resistant material as a cover for a vial pack, comprising the following steps:
   a. providing a cover made of a solvent-resistant material including a plurality of plug portions, wherein the solvent resistant material is silicone rubber with a fluoropolymer made from siloxanes substituted with 10%–30% 3,3,3-trifluoropropyl groups; and
   b. engaging the cover with a vial pack having a plurality of containers therein, wherein each plug portion releasably engages one of the containers.

2. A method of using a barrier layer with a base of heat curable rubber as a cover for a vial pack, comprising the following steps:
   a. providing a cover having a plurality of plug portions, wherein the plug portions include a base of heat curable rubber and a barrier layer between 3 mils and 25 mils of skived polytetrafluoroethylene etched with sodium naphthalene thereon; and
   b. engaging the cover with a vial pack having a plurality of containers therein, wherein each plug portion releasably engages one of the containers.

3. A method of using a barrier layer with a base of heat curable rubber as a cover for a vial pack, comprising the following steps:
   a. providing a cover having a plurality of plug portions, wherein the plug portions include a base of heat curable rubber and a barrier layer formed of a continuous roll of cast liquid polytetrafluoroethylene; and
   b. engaging the cover with a vial pack having a plurality of containers therein, wherein each plug portion releasably engages one of the containers.

4. A method of using a barrier layer with a base of heat curable rubber as a cover for a vial pack, comprising the following steps:
   a. providing a cover having a plurality of plug portions, wherein the plug portions include a base of heat curable rubber and a barrier layer formed of at least 2 mils of fluorinated ethylene propylene treated by plasma; and
   b. engaging the cover with a vial pack having a plurality of containers therein, wherein each plug portion releasably engages one of the containers.

5. A vial pack cover, comprising a plurality of plug portions joined together, wherein the plug portions are formed from a solvent-resistant material, wherein the solvent-resistant material is a silicone rubber with a fluoropolymer made from siloxanes substituted with 10%–30% 3,3,3-trifluoropropyl groups.

6. A vial pack cover, comprising:
   a plurality of plug portions joined together, wherein the plug portions are formed from a base of heat curable rubber, and wherein the base of heat curable rubber has a barrier layer between 3 mils and 25 mils of skived polytetrafluoroethylene etched with sodium naphthalene thereon.

7. A vial pack cover, comprising:
   a plurality of plug portions joined together, wherein the plug portions are formed from a base of heat curable rubber, and wherein the base of heat curable rubber has a barrier layer formed of a continuous roll of cast liquid polytetrafluoroethylene thereon.

8. A vial pack cover, comprising:
   a plurality of plug portions joined together, wherein the plug portions are formed from a base of heat curable rubber, and wherein the base of heat curable rubber has a barrier layer formed of at least 2 mils of fluorinated ethylene propylene treated by plasma thereon.

9. A vial pack cover comprising:
   a. a support sheet;
   b. a plurality of plug portions fixed to the support sheet, wherein both the support sheet and the plug portions are formed from a solvent-resistant material, and wherein the solvent-resistant material is a silicone rubber with a fluoropolymer made from siloxanes substituted with 10%–30% 3,3,3-trifluoropropyl groups.

10. A vial pack cover comprising:
    a. a support sheet;
    b. a plurality of plug portions fixed to the support sheet, wherein both the support sheet and the plug portions are formed from a base of heat curable rubber, and wherein the base of heat curable rubber has a barrier layer between 3 mils and 25 mils of skived polytetrafluoroethylene etched with sodium naphthalene thereon.

11. A vial pack cover comprising:
    a. a support sheet;
    b. a plurality of plug portions fixed to the support sheet, wherein both the support sheet and the plug portions are formed from a base of heat curable rubber, and wherein the base of heat curable rubber has a barrier layer formed of a continuous roll of cast liquid polytetrafluoroethylene thereon.

12. A vial pack cover comprising:
    a. a support sheet;
    b. a plurality of plug portions fixed to the support sheet, wherein both the support sheet and the plug portions are formed from a base of heat curable rubber, and wherein the base of heat curable rubber has a barrier layer formed of at least 2 mils of fluorinated ethylene propylene treated by plasma thereon.

13. A vial pack kit, comprising:
    a. a pack, wherein the pack includes a plurality of containers;
    b. a cover for covering the pack, wherein the cover includes:
       1. a support sheet;
       2. plurality of plug portions integrally formed as a part of the support sheet, wherein both the support sheet and the plug portions are formed from a solvent-resistant material, wherein the solvent-resistant material is a silicone rubber with a fluoropolymer made from siloxanes substituted with 10%–30% 3,3,3-trifluoropropyl groups; and
       3. plug portions, wherein each plug portion releasably engages one of the containers of the pack.

14. A kit, comprising:
    a. a pack, wherein the pack includes a plurality of containers;
    b. a cover for covering the pack, wherein the cover includes:
       1. a support sheet;
       2. plurality of plug portions integrally formed as a part of the support sheet, wherein both the support sheet and the plug portions are formed from a base of heat curable rubber, and wherein the base heat curable rubber has a barrier layer between 3 mils and 25 mils of skived polytetrafluoroethylene etched with sodium naphthalene thereon; and
       3. plug portions, wherein each plug portion releasably engages one of the containers of the pack.

15. A kit, comprising:
    a. a pack, wherein the pack includes a plurality of containers;
    b. a cover for covering the pack, wherein the cover includes:
       1. a support sheet;
       2. plurality of plug portions integrally formed as a part of the support sheet, wherein both the support sheet and the plug portions are formed from a base of heat curable rubber, and wherein the base heat curable rubber has a barrier layer formed of a continuous roll of cast liquid polytetrafluoroethylene thereon; and
       3. plug portions, wherein each plug portion releasably engages one of the containers of the pack.

16. A kit, comprising:
    a. a pack, wherein the pack includes a plurality of containers;
    b. a cover for covering the pack, wherein the cover includes:
       1. a support sheet;
       2. plurality of plug portions integrally formed as a part of the support sheet, wherein both the support sheet and the plug portions are formed from a base of heat curable rubber, and wherein the base heat curable rubber has a barrier layer formed of at least 2 mils of fluorinated ethylene propylene treated by plasma; and 3. plug portions, wherein each plug portion releasably engages one of the containers of the pack.

17. A kit comprising:

a. a device for covering a pack including a plurality of plug portions, wherein the plug portions have been formed from a base of heat curable rubber, and wherein the base of heat curable rubber has a barrier layer between 3 mils and 25 mils of skived polytetrafluoroethylene etched with sodium naphthalene thereon; and b. an apparatus for removing one of the plug portions from the device.

18. A kit comprising:

a. a device for covering a pack including a plurality of plug portions, wherein the plug portions have been formed from a base of heat curable rubber, and wherein the base of heat curable rubber has a barrier layer formed of a continuous roll of cast liquid polytetrafluoroethylene thereon; and b. an apparatus for removing one of the plug portions from the device.

19. A kit comprising:

a. a device for covering a including a plurality of plug portions, wherein the plug portions have been formed from a base of heat curable rubber, and wherein the base of heat curable rubber has a barrier layer formed of at least 2 mils of fluorinated ethylene propylene treated by plasma thereon, and wherein the plug portions are joined together; and b. an apparatus for removing one of the plug portions from the device.

* * * * *

UNITED STATES PATENT AND TRADEMARK OFFICE
CERTIFICATE OF CORRECTION

PATENT NO. : 6,972,112 B1
DATED : December 6, 2005
INVENTOR(S) : Reo

It is certified that error appears in the above-identified patent and that said Letters Patent is hereby corrected as shown below:

<u>Title page,</u>
Item [56], References Cited, U.S. PATENT DOCUMENTS, delete "Weishselbaum" and insert -- Weichselbaum --; and insert the following:

| | | | |
|---|---|---|---|
| -- U.S. 5,484,566 | 01-1996 | Gabbard | 264/250 |
| U.S. 5,596,814 | 01-1997 | Zingle et al. | 34/296 |
| U.S. 5,264,276 | 11-1993 | McGregor et al. | 428/252 |
| U.S. 5,193,265 | 03-1993 | Muggli et al. | 29/527.4 |
| U.S. 5,637,307 | 06-1997 | Simmons et al. | 424/405 |
| U.S. 6,209,587 B1 | 04-2001 | Hsich et al | 138/137 |
| U.S. 6,162,206 | 12-2000 | Bindokas et al. | 604/533 |
| U.S. 6,145,430 | 11-2000 | Able et al. | 92/93 |
| U.S. 5,964,181 | 10-1999 | Pereyra et al. | 116/216 |
| U.S. 5,900,422 | 05-1999 | Ali | 514/316 |
| U.S. 4,915,243 | 04-1990 | Tatsumi et al. | 215/247 |
| U.S. 4,773,552 | 09-1988 | Boege et al. | 215/247 |
| U.S. 5,683,659 | 11-1997 | Hovatter | 422/99 --. |

<u>Column 5,</u>
Line 46, delete "accordance this" and insert -- accordance with this --.
Line 55, delete "method or 70" and insert -- method 10 or 70 --.

<u>Column 7,</u>
Line 2, delete "operation" and insert -- operations --.
Line 9, delete "40:" and insert -- 40. --.

UNITED STATES PATENT AND TRADEMARK OFFICE
CERTIFICATE OF CORRECTION

PATENT NO.    : 6,972,112 B1
DATED         : December 6, 2005
INVENTOR(S)   : Reo It is certified that error appears in the above-identified patent and that said Letters Patent is hereby corrected as shown below:

Column 8,
Line 21, delete "340" and insert -- 340° --.
Line 24, delete "1%"" and insert -- 1 1/2" --.

Signed and Sealed this

Twenty-first Day of February, 2006

JON W. DUDAS
*Director of the United States Patent and Trademark Office*